United States Patent Office 2,945,956
Patented July 19, 1960

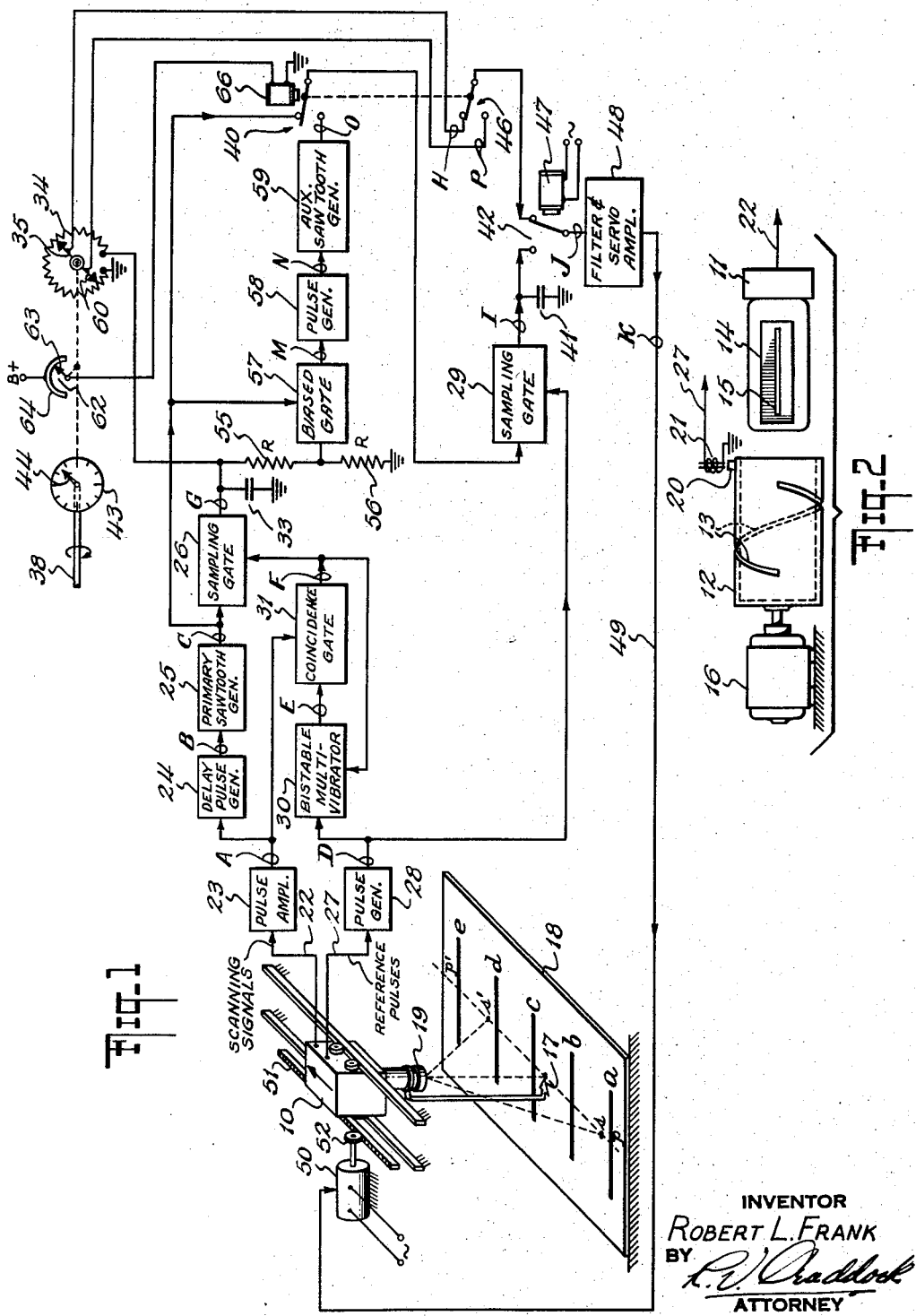

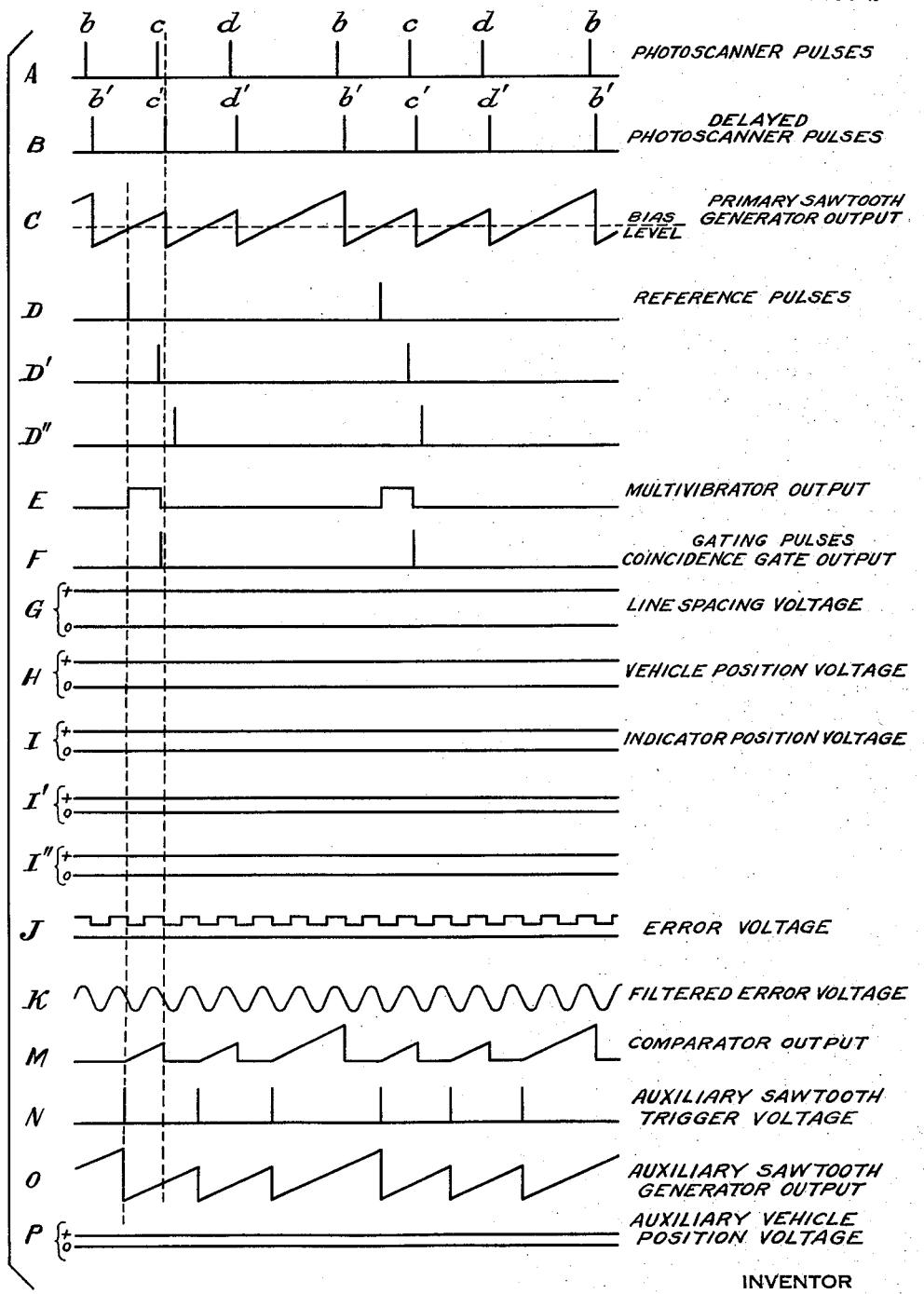

2,945,956
COURSE PLOTTER

Robert L. Frank, Great Neck, N.Y., assignor to Sperry Rand Corporation, a corporation of Delaware Filed May 28, 1956, Ser. No. 588,209

16 Claims. (Cl. 250—202)

This invention relates to automatic plotting systems, and more particularly to a system for continuously indicating the position of a moving vehicle on a chart representing an area by comparing signals derived from photoelectrically scanning the chart with signals corresponding to the position of the vehicle with respect to the area.

Maps and charts of geographical areas are employed for use in navigating vehicles such as boats and aircraft. Such charts usually have a reference grid superimposed on the geographical pattern. This grid may correspond to latitude and longitude coordinates, or to a navigational coordinate system, such as the hyperbolic lines of position used in loran. In plotting the position of a moving vehicle on such a chart, it is necessary to obtain continuous information of the position of the vehicle relative to the coordinate system employed, and using this information to interpolate between the lines comprising the grid in order to depict the position of the vehicle on the chart.

Thus, in loran, the lines of position are hyperboles and correspond to measured time differences between the arrival of pulses from radio transmitting stations. The intersection of a pair of lines of position corresponding to two measured time differences determines the position of the vehicle. For example, three adjacent grid lines may represent time differences of 1400, 1600, and 1800 microseconds respectively. When the position of the vehicle does not correspond to a coordinate line, it is necessary for the plotting system to interpolate between the grid lines corresponding to the nearest lines of position. Thus, if the loran time difference at the location of the vehicle were 1450 microseconds, the position of the vehicle on the chart would have to be represented at one-quarter of the distance between the grid lines corresponding to 1400 and 1600 microseconds.

In a patent application Serial No. 577,401, filed April 10, 1956, now Patent No. 2,892,948, in the name of Wilbert P. Frantz, there is disclosed an invention for automatically interpolating between two grid lines in order to represent the position of a vehicle between two coordinate lines. This is accomplished by comparing photoscanner output signals, derived from photo-electrically scanning the chart, with an input signal corresponding to the instantaneous position of the vehicle with respect to the coordinate system. A path transverse to the grid lines is scanned and a first voltage produced representing the chart distance between the two grid lines corresponding to the two coordinate lines adjacent the vehicle. This first voltage is supplied to a voltage divider which delivers a proportionate second voltage determined by the input signal. A third voltage is produced representing the distance between one of said two grid lines and a reference point fixed with respect to the photoscanner. A voltage comparator responsive to the difference between the second and third voltages energizes a servomotor to vary the position of the photoscanner until the reference point represents the position of the vehicle on the chart.

The vehicle may travel sufficiently far, however, that the locus of its course on the chart crosses a grid line. In such instance the interpolation circuit will not function to drive the reference point across the grid line. Accordingly, means must be added to the previously described invention to enable the automatic plotting of the course of a vehicle when the locus of said course crosses a grid line.

It is an object of this invention to automatically and continuously plot the position of a vehicle on a chart employing a superimposed reference grid.

It is a further object of this invention to automatically position an object with respect to a grid on a chart representing an area in accordance with input navigational signals representing the position of a vehicle with respect to said area.

Another object of this invention is to automatically move a photoscanner, while scanning lines of a chart grid, to a position with respect to said grid in accordance with input navigational data.

Another object of this invention is to automatically move a reference point across grid lines on a chart in accordance with input navigational data.

Another object of this invention is to provide for automatically plotting the locus of the course of a vehicle on a gridded chart representing an area when the locus crosses a grid line, in correspondence with the course of the vehicle in said area, when said course crosses a corresponding coordinate line.

In accordance with the present invention, the reference point fixed with respect to the photoscanner is proportionately positioned between the pair of grid lines defining the area in which the vehicle is located. However, when the vehicle moves to a point whose distance from a coordinate line is less than a predetermined value, the system no longer interpolates between grid lines but, instead, interpolates between points spaced midway between the grid lines. In this manner the vehicle's course may be smoothly plotted along a locus crossing a grid line.

The present invention will now be described with reference to the following drawings, wherein:

Fig. 1 is a block diagram of the scanning and positional control system of the present invention;

Fig. 2 is an exploded view of the photoscanner showing the phototube with an apertured mask covering the photosensitive cathode; and Fig. 3 illustrates waveforms of voltages associated with the block diagram of Fig. 1.

In Fig. 1, a photoelectric scanning device 10, hereinafter termed a photoscanner, is disposed above an illuminated chart 18 of the area in which the vehicle is to navigate. Superimposed on chart 18 is a grid system corresponding to the navigational coordinate system employed in said area, which includes the lines $a$, $b$, $c$, $d$, and $e$. Generally, a navigational coordinate system comprises two intersecting sets of lines, the lines of each set being non-intersecting. However, in certain special instances the lines of a set may intersect, as, for example, the meridians of longitude at the poles of the earth. The following description of this invention refers to a navigational coordinate system wherein each of the sets comprises a plurality of substantially equidistant parallel straight lines in the navigational area. However, the invention is not limited for use with a coordinate system of equidistant parallel straight lines. Only one line set is shown on chart 18. The photoscanner scans the chart along a locus $p$—$p'$ transversely to the grid lines. An indicator 17 or other reference point fixed with respect to the photoscanner 10 is representative of the photoscanner's position with respect to the chart. When the apparatus is in operation the position of the indicator with respect to the chart will correspond to the position of the vehicle with respect to the area represented by the chart. Although indicator 17 is shown affixed to photoscanner 10, it may be oriented for recording on a second adjacent chart, which represents the same area as chart 18, thereby avoiding possible interference with the photoelectric scanning operation.

The photoscanner includes a phototube 11 whose photocathode is covered with a mask 14 having a narrow aperture 15 extending parallel to the longitudinal axis of the phototube as shown in Fig. 2. The phototube 11 with mask 14 is situated within a hollow cylindrical drum 12 which has a one turn helical slit 13 in the wall thereof. Light is admitted to the cathode only through the small opening defined by the intersection of the narrow helical slit 13 and a narrow aperture 15 in mask 14. The cylindrical drum is rotated at constant angular velocity by motor 16 to provide scanning along a straight line segment s—s' of locus p—p' extending parallel to the longitudinal axis of the cylindrical drum. The image of the chart along the segment s—s' is focused at the plane of aperture 15, by a lens 19. As the point of intersection of slit 13 and aperture 15 moves due to the rotation of drum 12, different elements of the scanned line segment are exposed to the phototube. The photoscanner is similar to the scanner shown in application Serial No. 473,249, filed December 6, 1954, now Patent No. 2,871,369, in the name of Roger B. Williams, Jr. and assigned to the same assignee as the present invention.

A magnetic tab 20 is attached to the outside wall of cylindrical drum 12 at a position thereon corresponding to a point on the scanned segment s—s', such as the center of the scanned segment, and thus to the position of indicator 17 with respect to the scanned segment. As the cylindrical drum rotates at a constant angular velocity, the magnetic tab 20 revolves past a pick-up coil 21 and induces a reference pulse voltage across the terminals thereof at the instant the photoscanner is scanning the center point of the segment s—s'. In this example the indicator lies between grid lines b and c.

As photoscanner 10 scans line segment s—s', which crosses a number of the grid lines, shown by way of example in Fig. 1 to be lines b, c, and d, the phototube 11 delivers recurrent groups of pulses on a lead 22 corresponding to the grid lines being scanned. These pulses are amplified and shaped in a pulse amplifier 23 to produce recurrent groups of pulses of waveform A (illustrated in Fig. 3) in a manner similar to that shown and described in aforesaid pending Frantz application Serial No. 577,401. The time between the pulses of each group of waveform A varies according to the distance between the lines b, c, and d as measured along the locus p—p'. Thus, in waveform A, the recurrent pulses are identified by the lines to which they correspond. Photoscanner 10 is arranged to scan at least a total distance equal to twice the spacing between two adjacent grid lines.

The recurrent pulses of waveform A are coupled to a delay pulse generator 24 to produce the delayed output pulses of waveform B. These pulses are delayed only slightly from the pulses of waveform A. A primary sawtooth generator 25 is coupled to delay pulse generator 24 and is responsive to the pulses of waveform B, thereby producing a primary linear sawtooth voltage wave of waveform C. The peak values of this primary linear sawtooth voltage wave vary according to the time intervals between successive input pulses, thereby representing the distances between grid lines. Thus, the peak value of the primary linear sawtooth voltage cycle generated between the pulses designated as b' and c' is proportional to the distance between the grid lines b and c as measured along locus p—p'. The primary sawtooth voltage wave of waveform C is coupled to a sampling gate 26, which is a circuit designed to sample the magnitude of an input wave on receipt of a gating pulse.

The reference pulses induced in pick-up coil 21 are coupled through a lead 27 to a pulse generator 28, which shapes the input reference pulses to produce narrow reference pulses of waveform D. The reference pulses of waveform D are coupled to a sampling gate 29, where they act as gating pulses.

The reference pulses of waveform D are coupled to a bistable multivibrator 30. The reference pulses activate or turn on the bistable multivibrator. The output signal of multivibrator 30, waveform E, is coupled as one input signal to a coincidence gate 31. The photoscanner pulses of waveform A are coupled as a second input to coincidence gate 31. Gate 31 delivers an output signal upon the simultaneous application of two input signals. Thus gate 31 will deliver a pulse signal coincident with the first pulse of waveform A following each activation of multivibrator 30. A portion of the pulse signal output of gate 31, waveform F, is coupled back to multivibrator 30, and serves to deactivate or turn off the multivibrator. Thus, only one output pulse is delivered by gate 31 following each reference pulse delivered to multivibrator 30. The recurrent pulses of waveform F are also supplied as gating pulses to activate sampling gate 26. The combination of bistable multivibrator 30 and coincidence gate 31 is termed a pulse selector because of its apparent ability to pass only one of each group of pulses of waveform A.

Sampling gate 26 is recurrently actuated by the gating pulses of waveform F to periodically sample the magnitude of the primary linear sawtooth voltage wave of sawtooth generator 25. Sampling gate 26 charges a capacitor 33 to the instantaneous voltage of the primary sawtooth wave at the instant of occurrence of the gating pulses of waveform F. Because waveform C lags slightly the pulses of waveform A, capacitor 33 is charged to a voltage equal to the peak voltage of the primary sawtooth voltage cycle generated between the pulses b' and c' of waveform B. In other words, capacitor 33 produces a first direct voltage of waveform G whose magnitude is proportional to the distance between the lines b and c. This first direct voltage is coupled to a linear potentiometer voltage divider 34, which may be of a continuously rotatable type. A second direct voltage of waveform H is produced at an arm 35 of voltage divider 34.

The magnitude of the second direct voltage of waveform H bears a ratio to the magnitude of the first direct voltage of waveform G as determined by the setting of a shaft 38. A dial 43 and a pointer 44 coupled to shaft 38 may be calibrated in terms of percent of angular rotation of shaft 38, such that when voltage divider 34 produces a second direct voltage whose magnitude is equal to the magnitude of the first direct voltage, the pointer 44 indicates 100%. When voltage divider 34 produces zero output voltage at arm 35, the pointer 44 indicates 0%. Thus, where the linear potentiometer 34 is of the continuously rotatable type, one turn of shaft 38 represents 100% of the magnitude of the first direct voltage of waveform G. Accordingly, one turn of shaft 38 may be considered as representing the distance between the two grid lines adjacent the indicator as measured along locus p—p', and this relation is maintained regardless of the spacing between these lines. In the example shown one turn of shaft 38 corresponds to the distance between grid lines b and c.

An input positional signal proportional to the ratio of the distance of the vehicle from an adjacent coordinate line corresponding to the grid line b to the distance between the adjacent coordinate lines corresponding to grid lines b and c serves to position shaft 38. The percent rotation of shaft 38 corresponds directly to this ratio. Thus, the ratio of the second direct voltage to the first direct voltage is equal to said ratio. Consequently, voltage divider 34 acts as a proportioning means, delivering at arm 35 a voltage representing the position of the vehicle between grid lines b and c.

The second direct voltage of waveform H produced at arm 35 is coupled to the upper terminal of a relay 46.

When the movable contact of relay 46 is in its upper position, the second direct voltage is coupled to the right terminal of a relay 42.

The primary linear sawtooth voltage wave of primary sawtooth generator 25 is also coupled to the upper terminal of a relay 40, the movable contact of which is ganged to that of relay 46. With the movable contact of relay 40 in its upper position, the primary sawtooth voltage wave is coupled to sampling gate 29. Sampling gate 29 is recurrently actuated by the reference pulses of waveform D to periodically sample the magnitude of the linear sawtooth voltage wave applied. Sampling gate 29 charges a capacitor 41 to the instantaneous voltage of the sawtooth wave at the instant of occurrence of the reference pulses. Thus, in this illustration, capacitor 41 produces a direct voltage of waveform I whose magnitude is proportional to the distance between grid line $b$ and the indicator. The direct voltage produced by capacitor 41 is coupled to the left terminal of a relay 42.

An error control voltage whose magnitude varies according to the difference between the second direct voltage of waveform H and the direct voltage of waveform I is produced for controlling the position of indicator 17 along locus $p—p'$. This error control voltage is obtained from the movable contact of relay 42. This movable contact alternates between the fixed terminals at the frequency of an alternating switching voltage supplied to relay winding 47 and serves to compare the magnitudes of the two direct voltages applied to the fixed terminals. For the condition when the magnitude of the second direct voltage of waveform H exceeds the magnitude of the direct voltage of waveform I, the voltage at the movable contact of relay 42 appears as waveform J of Fig. 3. This voltage is coupled to a filter and servo amplifier 48 to produce the sinusoidal error voltage of waveform K. The phase of this error control voltage is determined by the larger of the two direct voltages which were compared, and its amplitude is determined by the difference between said two voltages.

The error control voltage is coupled through lead 49 to servomotor 50. An alternating voltage from the same source as the alternating switching voltage applied to relay winding 47 is supplied as a reference voltage to servomotor 50. The error control voltage of waveform K energizes servomotor 50 to drive the photoscanner 10 along its direction of scan by means of rack 51 and pinion 52 until the error control voltage is reduced substantially to zero, whereupon the position of the indicator with respect to the grid lines corresponds to the position of the vehicle with respect to the area represented by the chart.

Thus the system may be arranged to interpolate between adjacent loran lines of position where the grid lines $b$ and $c$ on chart 18 represent the loran lines between which the vehicle is located. Where these loran lines are spaced apart by a distance corresponding to a certain fixed time difference interval, for example, 100 microseconds, the shaft 38 must be properly geared and indexed to the input positional signal representing the measured loran number or time difference so that one revolution of shaft 38 corresponds to a change in time difference of 100 microseconds. A direct reading loran receiver such as the Mark II Loran manufactured by the Sperry Gyroscope Company, Division of Sperry Rand Corporation, indicates the measured time difference between the arrival of master and slave pulses as a number on a mechanically driven revolution counter. Accordingly, the mechanical shaft driving the revolution counter may be coupled through appropriate gearing so that a 100 microsecond change in the time difference as read on the revolution counter corresponds to one turn of shaft 38. For example, assume that the position of a vehicle to be navigated by means of the loran system is situated between two adjacent lines of position, one line corresponding to a time difference of 2600 microseconds and the other line corresponding to a time difference of 2700 microseconds. Grid lines $b$ and $c$ on chart 18 would correspond to the loran lines representing respectively 2600 and 2700 microseconds. Any intermediate angular position of shaft 38 corresponding to the position of the vehicle between the two loran lines produces a second direct voltage to which the direct voltage of capacitor 41 would be compared. Thus, the position of the indicator with respect to chart 18 represents the position of the vehicle between the loran lines of position.

The system thus far described is useful only so long as the vehicle remains between an adjacent pair of coordinate lines, since the system is only capable of interpolating between adjacent grid lines and is not capable of recording the course of a vehicle which crosses a coordinate line. Thus, in the particular example which has been described, if the vehicle were to move across the coordinate line corresponding to the grid line $c$ into the area bounded by the coordinate lines corresponding to grid lines $c$ and $d$, the indicator would not be capable of following, but instead would receive an error signal which would cause it to jump back to a point in the vicinity of grid line $b$. However, by incorporating the principle of this invention into the system previously described the indicator can smoothly plot the course of the vehicle as it navigates across coordinate lines.

In this invention the photoscanner interpolates between adjacent points located midway between the grid lines along the locus $p—p'$, when the vehicle approaches close to any coordinate line. This auxiliary method of interpolation allows the indicator to cross a grid line without the operative portion of the system sensing its presence. Auxiliary interpolation is accomplished by generating and utilizing a pair of auxiliary voltages, one representing the position of the indicator relative to the midpoints between the grid lines and the other representing the position of the vehicle relative to the midpoints between the coordinate lines.

The first direct voltage produced by capacitor 33 is also coupled to a voltage divider, such as resistors 55 and 56, which in turn produces an output direct voltage whose magnitude is one-half that of the first direct voltage. This voltage divider output direct voltage and the primary sawtooth voltage wave of waveform C are coupled to a biased gate 57. The direct voltage acts as a type of bias for gate 57 allowing no output voltage from the gate until the sawtooth voltage wave is greater than this bias. When the primary sawtooth wave becomes greater than the bias direct voltage (waveform C) an output voltage wave is produced by gate 57, the instantaneous value of the output voltage being proportional to the amount by which the sawtooth wave exceeds the bias voltage. The output wave from gate 57 is shown in wave form M. A pulse generator 58 is coupled to gate 57 and is responsive to the output voltage thereof, producing a pulse at the instant the sawtooth wave to gate 57 exceeds the bias level. The pulse train generated by pulse generator 58 is shown in waveform N. An auxiliary sawtooth generator 59 is coupled to pulse generator 58 and is responsive to its output pulse train, producing an auxiliary linear sawtooth voltage wave of waveform O. The auxiliary sawtooth voltage wave is coupled to the lower terminal of relay 40. Thus, the movable contact of relay 40 selects either the primary sawtooth voltage wave applied to its upper terminal or the auxiliary sawtooth voltage wave applied to its lower terminal. In the example illustrated the auxiliary sawtooth voltage wave lags the primary sawtooth voltage wave by one-half the time interval between the photoscanner pulses corresponding to grid lines $b$ and $c$.

A third direct voltage of waveform P is produced at an arm 60 of voltage divider 34. Arm 60 is disposed diametrically from arm 35 and is insulated therefrom. Because total rotation of shaft 38 represents 100% of the magnitude of the first direct voltage of wave form G, the magnitude of the third direct voltage differs by 50% from that of the second direct voltage. Since the ratio of the second direct voltage to the first direct voltage is equal to the ratio represented by the input positional signal, it follows that the ratio of the third direct voltage to the first direct voltage differs from the ratio represented by the input positional signal by the value one-half. Consequently the third direct voltage represents the position of the vehicle with respect to points spaced midway between the coordinate lines. The third direct voltage is coupled to the lower terminal of relay 46.

The positions of the movable contacts of relay 40 and 46 are determined by the setting of shaft 38. A rotary switch 62 comprises a movable contact 63 and a fixed arcuate contact 64. Movable contact 63 is connected to shaft 38 so that the position of movable arm 63 corresponds to the position of pointer 44 and arm 35. Fixed contact 64 subtends an arc of 180°, and is connected to a voltage source. Connection is made between movable contact 63 and fixed contact 64 only when arm 35 is farther than 90° from either extremity of voltage divider 34. When connection is made between contacts 63 and 64 a voltage is delivered to relay winding 66 causing the movable contacts of relays 40 and 46 to contact the upper terminals of their respective relays. As the degree of rotation of shaft 38 represents the position of the vehicle with respect to the adjacent coordinate lines, relay winding 66 is energized whenever the vehicle is farther from the nearest coordinate line than one-quarter the distance between the two coordinate lines adjacent the vehicle. When the vehicle is nearer any coordinate line than one-quarter of said distance, relay winding 66 is not energized.

Consequently, in the illustration, when the vehicle is not close to any coordinate line, relay winding 66 is energized, and the primary sawtooth voltage wave is coupled to sampling gate 29 and the second direct voltage is coupled to the right terminal of relay 42. In this condition, as described previously, relay 42 functions as a comparator and compares two direct voltages representing respectively the position of the indicator with respect to the grid lines with the position of the vehicle with respect to the coordinate lines. An appropriate error signal will be generated to make the two direct voltages equal. On the other hand, when the vehicle approaches a coordinate line corresponding to line c, relay winding 66 is not energized and the auxiliary sawtooth voltage wave is coupled to sampling gate 29 and the third direct voltage is coupled to the right terminal of relay 42. Sampling gate 29 now charges capacitor 41 to the instantaneous voltage of the auxiliary sawtooth wave at the instant of occurrence of the reference pulses. Capacitor 41 produces a direct voltage whose magnitude is proportional to the distance between the indicator and a point midway between grid line b and grid line c. In this condition relay 42 compares two direct voltages respectively representing the position of the indicator with respect to a point midway between the grid lines and the position of the vehicle with respect to a point midway between the coordinate lines. An appropriate error signal will be generated to make the two direct voltages equal. Thus, by employing the third direct voltage in lieu of the second direct voltage and the auxiliary sawtooth voltage wave in lieu of the primary sawtooth voltage wave the apparatus is able to plot the course of the vehicle as it crosses coordinate lines.

For additional convenience in understanding the operation of this invention, wave forms D', D" and I', I" have been included in Fig. 3. Waveforms D' and D" indicate respectively the reference pulses corresponding to the relative positions of the indicator as the indicator first approaches grid line c, and second crosses grid line c and moves toward grid line d. Thus waveform D' illustrates the approach of the indicator to grid line c in accordance with movement of the vehicle toward the coordinate line corresponding to grid line c. Waveform D" illustrates the position of the indicator after it has crossed grid line c. Waveforms I' and I" illustrate the amplitudes of the direct voltage from capacitor 41, when the auxiliary sawtooth voltage wave is applied to sampling gate 29, and the indicator is in the respective positions illustrated by waveforms D' and D".

Although this invention has been described as employing direct voltages to represent various ratios and linear distances, it is within the scope of this invention to employ signals of other types, such as electrical signals of differing alternating voltages, electrical signals of differing frequencies, digital code signals, mechanical signals of shaft rotation, mechanical signals of displacement.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for automatically locating an indicator with respect to a chart representing an area to correspond with the position of a point with respect to said area, the position of said point with respect to said area being described by its location relative to an arbitrary coordinate system fixed with respect to said area, said coordinate system comprising at least one set of nonintersecting lines, said chart being illuminated and having superimposed thereon a plurality of nonintersecting grid lines corresponding to said coordinate lines, said apparatus receiving an input signal representing a first ratio equal to the distance of said point from an adjacent coordinate line divided by the distance between the two coordinate lines adjacent said point, comprising a photoscanner fixed with respect to said indicator and having photosensitive means for producing an output electrical signal in accordance with the amount of light received and a directive means for directing light received from an elemental area of said chart upon said photosensitive means, means for recurrently varying the orientation of said directive means whereby said photosensitive means receives light recurrently and successively from a series of contiguous elemental areas defining a locus transverse to said grid lines, whereby the output signal from said photosensitive means consists of recurrent groups of first pulses corresponding to said grid lines, said groups being recurrent at the frequency of variation of the orientation of said directive means, and the time between pulses of a group corresponding to the spacing of said grid lines along said locus, a reference pulse generator for generating reference pulses recurrent at the frequency of variation of the orientation of said directive means, said reference pulses having a temporal relationship to the pulses of said groups corresponding to the location of said indicator with respect to said grid lines, a first sawtooth generator coupled to said photoscanner and responsive to said first pulses for generating a first linear sawtooth voltage wave, first gating means coupled to said first sawtooth generator and responsive to said first sawtooth voltage wave for producing a first direct voltage having a magnitude equal to the peak magnitude of the individual sawtooth voltage cycle generated during the interval between the pair of first pulses occurring immediately before and immediately after a reference pulse, first proportioning means responsive to said input signal and coupled to said first gating means for receiving said first direct voltage and for delivering a second direct voltage bearing a ratio to said first direct voltage equal to said first ratio, second proportioning means responsive to said input signal and coupled to said first gating means for receiving said first direct voltage and for delivering a third direct voltage bearing a ratio to said first direct voltage differing from said first ratio by the number one-half, a second sawtooth generator for generating a second linear sawtooth voltage wave lagging said first linear sawtooth voltage wave by an amount equal to one-half the time interval between said pulse pair, second gating means for producing a fourth direct voltage equal to the instantaneous magnitude of a voltage wave received at a first input terminal when said second gating means is triggered by a pulse applied to a second input terminal, said second input terminal being coupled to said reference pulse generator, comparator means for producing an error control voltage corresponding to the difference between a pair of input direct voltages, said comparator means being coupled to said second gating means for receiving said fourth direct voltage, means for coupling said first sawtooth voltage wave to the first input terminal of said second gating means and for coupling said second direct voltage to said comparator means when said first ratio has a value corresponding to one of a predetermined range of values, means for coupling said second sawtooth voltage wave to the first input terminal of said second gating means and for coupling said third direct voltage to said comparator means when said first ratio has a value other than one of said predetermined range of values, whereby said comparator means receives a pair of direct voltages representing respectively the position of said indicator with respect to said chart and the position of said point with respect to said area, and servomechanism means coupled to said photoscanner and responsive to said error control voltage for automatically moving said photoscanner to decrease the magnitude of said error control voltage.

2. Apparatus for automatically locating an indicator with respect to a chart representing an area to correspond with the position of a vehicle with respect to said area, the position of said vehicle with respect to said area being described by its location relative to an arbitrary coordinate system fixed with respect to said area, said coordinate system comprising at least one set of lines, said chart being illuminated and having superimposed thereon a plurality of grid lines corresponding to said coordinate lines, said apparatus receiving an input signal representing a first ratio equal to the distance of said vehicle from an adjacent coordinate line divided by the distance between the two coordinate lines adjacent said vehicle, comprising a photoscanner fixed with respect to said indicator and having a photosensitive means for producing an output electrical signal in accordance with the amount of light received and a directive means for directing light received from an elemental area of said chart upon said photosensitive means, means for recurrently varying the orientation of said directive means whereby said photosensitive means receives light recurrently and successively from a series of contiguous elemental areas defining a locus transverse to said grid lines, whereby the output signal from said photosensitive means consists of recurrent groups of first pulses corresponding to said grid lines, said groups being recurrent at the frequency of variation of the orientation of said directive means, and the time between pulses of a group corresponding to the spacing of said grid lines along said locus, a reference pulse generator coupled to said photoscanner for generating reference pulses recurrent at the frequency of variation of the orientation of said directive means, said reference pulses having a temporal relationship to the pulses of said groups corresponding to the location of said indicator with respect to said grid lines, a first sawtooth generator coupled to said photoscanner and responsive to said first pulses for generating a first linear sawtooth voltage wave, first gating means coupled to said first sawtooth generator and responsive to said first sawtooth voltage wave for producing a first direct voltage having a magnitude equal to the peak magnitude of the individual sawtooth voltage cycle generated during the interval between the pair of first pulses occurring immediately before and immediately after a reference pulse, first proportioning means responsive to said input signal and coupled to said first gating means for receiving said first direct voltage and for delivering a second direct voltage bearing a ratio to said first direct voltage equal to said first ratio, second proportioning means responsive to said input signal and coupled to said first gating means for receiving said first direct voltage and for delivering a third direct voltage bearing a ratio to said first direct voltage differing from said first ratio by the number one-half, a second sawtooth generator coupled to said first sawtooth generator for receiving said first linear sawtooth voltage wave and for generating a second linear sawtooth voltage wave lagging said first sawtooth voltage wave by an amount equal to one-half the time interval between said pulse pair, second gating means for producing a fourth direct voltage equal to the instantaneous magnitude of a voltage wave received at a first input terminal when said second gating means is triggered by a pulse applied to a second input terminal, said second input terminal being coupled to said reference pulse generator, comparator means for producing an error control voltage corresponding to the difference between a pair of input direct voltages, said comparator means being coupled to said second gating means for receiving said fourth direct voltage, means for coupling said first sawtooth voltage wave to the first input terminal of said second gating means and for coupling said second direct voltage to said comparator means when said first ratio has a value corresponding to one of a predetermined range of values, means for coupling said second sawtooth voltage wave to the first input terminal of said second gating means and for coupling said third direct voltage to said comparator means when said first ratio has a value other than one of said predetermined range of values, whereby said comparator means receives a pair of direct voltages representing respectively the position of said indicator with respect to said chart and the position of said vehicle with respect to said area, and servomechanism means electrically coupled to said comparator and responsive to said error control voltage and mechanically coupled to said photoscanner for automatically moving said photoscanner to decrease the magnitude of said error control voltage.

3. Apparatus for automatically locating an indicator with respect to a chart representing an area to correspond with the position of a vehicle with respect to said area, the position of said vehicle with respect to said area being described by its location relative to an arbitrary coordinate system fixed with respect to said area, said coordinate system comprising at least one set of nonintersecting lines, said chart being illuminated and having superimposed thereon a plurality of nonintersecting grid lines corresponding to said coordinate lines, said apparatus receiving an input signal representing a first ratio equal to the distance of said vehicle from an adjacent coordinate line divided by the distance between the two coordinate lines adjacent said vehicle, comprising a photoscanner fixed with respect to said indicator and having photosensitive means for producing an output electrical signal in accordance with the amount of light received and a directive means for directing light received from an elemental area of said chart upon said photosensitive means, means for recurrently varying the orientation of said directive means whereby said photosensitive means receives light recurrently and successively from a series of contiguous elemental areas defining a locus transverse to said grid lines, whereby the output signal from said photosensitive means consists of recurrent groups of first pulses corresponding to said grid lines, said groups being recurrent at the frequency of variation of the orientation of said directive means, and the time between pulses of a group corresponding to the spacing of said grid lines along said locus, a reference pulse generator coupled to said photoscanner for generating reference pulses recurrent at the frequency of variation of the orientation of said directive means, said reference pulses having a temporal relationship to the pulses of said groups corresponding to the location of said indicator with respect to said grid lines, delay means coupled to said photoscanner and responsive to said first pulses for producing an output signal comprising recurrent groups of second pulses corresponding to said grid lines, said second pulses lagging said first pulses by a time small compared to the time between any two successive first pulses, a first sawtooth generator coupled to said delay means and responsive to said second pulses for generating a first linear sawtooth voltage wave, a pulse selector means coupled to said photoscanner and to said reference pulse generator and responsive to said first pulses and said reference pulses for producing gating pulses simultaneously with the first pulse immediately following said reference pulses, first gating means coupled to said first sawtooth generator and to said pulse selector means and responsive to said gating pulses for producing a first direct voltage having a magnitude equal to the peak magnitude of the individual sawtooth voltage cycle corresponding to said gating pulse, first proportioning means responsive to said input signal and coupled to said first gating means for receiving said first direct voltage and for delivering a second direct voltage bearing a ratio to said first direct voltage equal to said first ratio, second proportioning means responsive to said input signal and coupled to said first gating means for receiving said first direct voltage and for delivering a third direct voltage bearing a ratio to said first direct voltage differing from said first ratio by the number one-half, voltage dividing means coupled to said first gating means and responsive to said first direct voltage for producing a direct voltage having a magnitude equal to one-half that of said first direct voltage, a second sawtooth generator coupled to said first sawtooth generator and responsive to the direct voltage produced by said voltage dividing means for generating a second linear sawtooth voltage wave lagging said first sawtooth voltage wave by an amount equal to one-half the duration of said individual sawtooth voltage cycle, second gating means for producing a fourth direct voltage equal to the instantaneous magnitude of a voltage wave received at a first input terminal when said second gating means is triggered by a pulse applied to a second input terminal, said second input terminal being coupled to said reference pulse generator, comparator means for producing an error control voltage corresponding to the difference between a pair of input direct voltages, said comparator means being coupled to said second gating means for receiving said fourt direct voltage, means for coupling said first sawtooth voltage wave to the first input terminal of said second gating means and for coupling said second direct voltage to said comparator means when said first ratio has a value corresponding to one of a predetermined range of values, means for coupling said second sawtooth voltage wave to the first input terminal of said second gating means and for coupling said third direct voltage to said comparator means when said first ratio has a value other than one of said predetermined range of values, whereby said comparator means receives a pair of direct voltages representing respectively the position of said indicator with respect to said chart and the position of said vehicle with respect to said area, and servomechanism means electrically coupled to said comparator and responsive to said error control voltage and mechanically coupled to said photoscanner for automatically moving said photoscanner to decrease the magnitude of said error control voltage.

4. Apparatus as in claim 2 wherein said first and second proportioning means each comprises voltage divider means including a shaft for controlling the amount of voltage division produced therein according to the angular position of said shaft, the angular position of said shaft corresponding to said input signal.

5. Apparatus for comparing the location of a photoscanner with respect to a chart representing an area with the position of a vehicle with respect to said area, the position of said vehicle with respect to said area being described by its location relative to an arbitrary coordinate system fixed with respect to said area, said coordinate system comprising at least one set of nonintersecting lines in the area of operation, said chart being illuminated and having superimposed thereon a plurality of nonintersecting grid lines corresponding to said coordinate lines, said apparatus receiving an input signal representing a first ratio equal to the distance of said vehicle from an adjacent coordinate line divided by the distance between the two coordinate lines adjacent said vehicle, said photoscanner having photosensitive means for producing an output electrical signal in accordance with the amount of light received and directive means for directing light received from an elemental area of said chart upon said photosensitive means, the orientation of the directive means being recurrently varied, whereby said photosensitive means receives light recurrently and successively from a series of contiguous elemental areas defining a locus transverse to said grid lines, whereby the output signal from said photosensitive means consists of recurrent groups of first pulses corresponding to said grid lines, said groups being recurrent at the frequency of variation of the orientation of said directive means, and the time between pulses of a group corresponding to the spacing of said grid lines along said locus, comprising in combination, a reference pulse generator coupled to said photoscanner for generating reference pulses recurrent at the frequency of variation of the orientation of said directive means, said reference pulses having a temporal relationship to the pulses of said groups corresponding to the location of a reference point on said photoscanner with respect to said grid lines, a first sawtooth generator coupled to said photoscanner and responsive to said first pulses for generating a first linear sawtooth voltage wave, first gating means coupled to said first sawtooth generator and responsive to said first sawtooth voltage wave for producing a first direct voltage having a magnitude equal to the peak magnitude of the individual sawtooth voltage cycle generated during the interval between the pair of first pulses occurring immediately before and immediately after a reference pulse, first proportioning means responsive to said input signal and coupled to said first gating means for receiving said first direct voltage and for delivering a second direct voltage bearing a ratio to said first direct voltage equal to said first ratio, second proportioning means responsive to said input signal and coupled to said first gating means for receiving said first direct voltage and for delivering a third direct voltage bearing a ratio to said first direct voltage differing from said first ratio by the number one-half, a second sawtooth generator coupled to said first sawtooth generator for receiving said first linear sawtooth voltage wave and for generating a second linear sawtooth voltage wave lagging said first sawtooth voltage wave by an amount equal to one-half the time interval between said pulse pair, second gating means for producing a fourth direct voltage equal to the instantaneous magnitude of a voltage wave received at a first input terminal when said second gating means is triggered by a pulse applied to a second input terminal, said second input terminal being coupled to said reference pulse generator, comparator means for producing an error control voltage corresponding to the difference between a pair of input direct voltages, said comparator means being coupled to said second gating means for receiving said fourth direct voltage, means for coupling said first sawtooth voltage wave to the first input terminal of said second gating means and for coupling said second direct voltage to said comparator means when said first ratio has a value corresponding to one of a predetermined range of values, means for coupling said second sawtooth voltage wave to the first input terminal of said second gating means and for coupling said third direct voltage to said comparator means when said first ratio has a value other than one of said predetermined range of values, whereby said comparator means receives a pair of direct voltages representing respectively the position of said photoscanner reference point with respect to said chart and the position of said vehicle with respect to said area.

6. Apparatus as in claim 2 wherein said predetermined range of values includes the range of numbers between one-quarter and three-quarters.

7. Apparatus for automatically locating an indicator with respect to a chart representing an area to correspond with the position of a vehicle with respect to said area, the position of said vehicle with respect to said area being described by its location relative to an arbitrary coordinate system fixed with respect to said area, said coordinate system comprising at least one set of lines, said chart being illuminated and having superimposed thereon a plurality of grid lines corresponding to said coordinate lines, said apparatus receiving an input signal representing a first ratio equal to the distance of said vehicle from an adjacent coordinate line divided by the distance between the two coordinate lines adjacent said vehicle, comprising a photoscanner fixed with respect to said indicator and having photosensitive means for producing an output electrical signal in accordance with the amount of light received and a directive means for directing light received from an elemental area of said chart upon said photosensitive means, means for recurrently varying the orientation of said directive means whereby said photosensitive means receives light recurrently and successively from a series of contiguous elemental areas defining a locus transverse to said grid lines, whereby the output signal from said photosensitive means consists of recurrent groups of first pulses corresponding to said grid lines, said groups being recurrent at the frequency of variation of the orientation of said directive means, and the time between pulses of a group corresponding to the spacing of said grid lines along said locus, a reference pulse generator coupled to said photoscanner for generating reference pulses recurrent at the frequency of variation of the orientation of said directive means, said reference pulses being generated at the center of each recurrence cycle of the output signal from said photosensitive means, a first sawtooth generator coupled to said photoscanner and responsive to said first pulses for generating a first linear sawtooth voltage wave, first gating means coupled to said first sawtooth generator and responsive to said first sawtooth voltage wave for producing a first direct voltage having a magnitude equal to the peak magnitude of the individual sawtooth voltage cycle generated during the interval between the pair of first pulses occurring immediately before and immediately after a reference pulse, first proportioning means responsive to said input signal and coupled to said first gating means for receiving said first direct voltage and for delivering a second direct voltage bearing a ratio to said first direct voltage equal to said first ratio, second proportioning means responsive to said input signal and coupled to said first gating means for receiving said first direct voltage and for delivering a third direct voltage bearing a ratio to said first direct voltage differing from said first ratio by the number one-half, a second sawtooth generator coupled to said first sawtooth generator for receiving said first linear sawtooth voltage wave and for generating a second linear sawtooth voltage wave lagging said first sawtooth voltage wave by an amount equal to one-half the time interval between said pulse pair, second gating means for producing a fourth direct voltage equal to the instantaneous magnitude of a voltage wave received at a first input terminal when said second gating means is triggered by a pulse applied to a second input terminal, said second input terminal being coupled to said reference pulse generator, comparator means for producing an error control voltage corresponding to the difference between a pair of input direct voltages, said comparator means being coupled to said second gating means for receiving said fourth direct voltage, means for coupling said first sawtooth voltage wave to the first input terminal of said second gating means and for coupling said second direct voltage to said comparator means when said first ratio has a value corresponding to one of a predetermined range of values, means for coupling said second sawtooth voltage wave to the first input terminal of said second gating means and for coupling said third direct voltage to said comparator means when said first ratio has a value other than one of said predetermined range of values, whereby said comparator means receives a pair of direct voltages representing respectively the position of said indicator with respect to said chart and the position of said vehicle with respect to said area, and servomechanism means electrically coupled to said comparator and responsive to said error control voltage and mechanically coupled to said photoscanner for automatically moving said photoscanner to decrease the magnitude of said error control voltage.

8. Apparatus for automatically locating an indicator with respect to a chart representing an area to correspond with the position of a vehicle with respect to said area, the position of said vehicle with respect to said area being described by its location relative to an arbitrary coordinate system fixed with respect to said area, said coordinate system comprising at least one set of nonintersecting lines, said chart being illuminated and having superimposed thereon a plurality of nonintersecting grid lines corresponding to said coordinate lines, said apparatus receiving an input signal representing a first ratio equal to the distance of said vehicle from an adjacent coordinate line divided by the distance between the two coordinate lines adjacent said vehicle, comprising a photoscanner fixed with respect to said indicator and having photosensitive means for producing an output electrical signal in accordance with the amount of light received and a directive means for directing light received from an elemental area of said chart upon said photosensitive means, means for recurrently varying the orientation of said directive means whereby said photosensitive means receives light recurrently and successively from a series of contiguous elemental areas defining a locus transverse to said grid lines, whereby the output signal from said photosensitive means consists of recurrent groups of first pulses corresponding to said grid lines, said groups being recurrent at the frequency of variation of the orientation of said directive means, and the time between pulses of a group corresponding to the spacing of grid lines along said locus, a reference pulse generator coupled to said photoscanner for generating reference pulses recurrent at the frequency of variation of the orientation of said directive means, said reference pulses having a temporal relationship to the pulses of said groups corresponding to the location of said indicator with respect to said grid lines, a first sawtooth generator coupled to said photoscanner and responsive to said first pulses for generating a first linear sawtooth voltage wave, first gating means coupled to said first sawtooth generator and responsive to said first sawtooth voltage wave for producing a first direct voltage having a magnitude equal to the peak magnitude of the individual sawtooth voltage cycle generated during the interval between the pair of first pulses occurring immediately before and immediately after a reference pulse, proportioning means responsive to said input signal and coupled to said first gating means for receiving said first direct voltage and for delivering a second direct voltage bearing a ratio to said first direct voltage equal to said first ratio and for delivering a third direct voltage bearing a ratio to said first direct voltage differing from said first ratio by the number one-half, a second sawtooth generator coupled to said first sawtooth generator for receiving said first linear sawtooth voltage wave and for generating a second linear sawtooth voltage wave lagging said first sawtooth voltage wave by an amount equal to one-half the time interval between said pulse pair, second gating means for producing a fourth direct voltage equal to the instantaneous magnitude of a voltage wave received at a first input terminal when said second gating means is triggered by a pulse applied to a second input terminal, said second input terminal being coupled to said reference pulse generator, comparator means for producing an error control voltage corresponding to the difference between a pair of input direct voltages, said comparator means being coupled to said second gating means for receiving said fourth direct voltage, means for coupling said first sawtooth voltage wave to the first input terminal of said second gating means and for coupling said second direct voltage to said comparator means when said first ratio has a value corresponding to one of a predetermined range of values, means for coupling said second sawtooth voltage wave to the first input terminal of said second gating means and for coupling said third direct voltage to said comparator means when said first ratio has a value other than one of said predetermined range of values, whereby said comparator means receives a pair of direct voltages representing respectively the position of said indicator with respect to said chart and the position of said vehicle with respect to said area, and servomechanism means electrically coupled to said comparator and responsive to said error control voltage and mechanically coupled to said photoscanner for automatically moving said photoscanner to decrease the magnitude of said error control voltage.

9. Apparatus as in claim 8 wherein said proportioning means comprises voltage divider means including a shaft for controlling the amount of voltage division produced thereon according to the angular position of said shaft, the angular position of said shaft corresponding to said input signal, said voltage divider means further including a pair of diametrically opposed arms coupled to said shaft, one of said arms generating said second direct voltage and the other of said arms generating said third direct voltage.

10. Apparatus for comparing the location of a first point with respect to a chart representing an area with the position of a second point with respect to said area, the position of said second point with respect to said area being described by its location relative to an arbitrary coordinate system fixed with respect to said area, said coordinate system comprising at least one set of substantially equidistant parallel straight lines, said chart having superimposed thereon a plurality of substantially equidistant parallel straight grid lines corresponding to said coordinate lines, said apparatus receiving an input first signal representing a first ratio equal to the distance of said second point from an adjacent coordinate line divided by the distance between two adjacent coordinate lines, and wherein a second signal is generated representing a second ratio equal to the distance of said first point from an adjacent grid line corresponding to said adjacent coordinate line divided by the distance between two adjacent grid lines, comprising in combination, means for generating a third signal representing a third ratio equal to the distance of said first point from an adjacent third point located between said grid lines divided by the distance between two adjacent grid lines, means for generating a fourth signal representing a fourth ratio equal to the distance of said second point from an adjacent fourth point having a location between said coordinate lines corresponding to said third point divided by the distance between two adjacent coordinate lines, and comparator means for producing an error signal corresponding to the difference between a pair of received signals, said comparator means being adapted to receive said first and second signals when said first ratio has a value equal to one of a predetermined range of values, said comparator means being further adapted to receive said third and fourth signals when said first ratio has a value other than one of said predetermined range of values.

11. Apparatus for automatically locating an indicator with respect to a chart representing an area to correspond with the position of a point with respect to said area, the position of said point with respect to said area being described by its location relative to an arbitrary coordinate system fixed with respect to said area, said coordinate system comprising at least one set of substantially equidistant parallel straight lines, said chart being illuminated and having superimposed thereon a plurality of substantially equidistant parallel straight grid lines corresponding to said coordinate lines, said apparatus receiving an input signal representing a first ratio equal to the distance of said point from an adjacent coordinate line divided by the distance between the two coordinate lines adjacent said point, comprising a photoscanner fixed with respect to said indicator and having photosensitive means for producing an output electrical signal in accordance with the amount of light received and a directive means for directing light received from an elemental area of said chart upon said photosensitive means, means for recurrently varying the orientation of said directive means whereby said photosensitive means receives light recurrently and successively from a series of contiguous elemental areas defining a locus transverse to said grid lines, whereby the output signal from said photosensitive means consists of recurrent groups of first pulses corresponding to said grid lines, said groups being recurrent at the frequency of variation of the orientation of said directive means, and the time between pulses of a group corresponding to the spacing of said grid lines along said locus, a reference pulse generator for generating reference pulses recurrent at the frequency of variation of the orientation of said directive means, said reference pulses having a temporal relationship to the pulses of said groups corresponding to the location of said indicator with respect to said grid lines, a first sawtooth generator coupled to said photoscanner and responsive to said first pulses for generating a first linear sawtooth voltage wave, first gating means coupled to said first sawtooth generator and responsive to said first sawtooth voltage wave for producing a first direct voltage having a magnitude equal to the peak magnitude of the individual sawtooth voltage cycle generated during the interval between the pair of first pulses occurring immediately before and immediately after a reference pulse, first proportioning means responsive to said input signal and coupled to said first gating means for receiving said first direct voltage and for delivering a second direct voltage bearing a ratio to said first direct voltage equal to said first ratio, second proportioning means responsive to said input signal and coupled to said first gating means for receiving said first direct voltage and for delivering a third direct voltage bearing a ratio to said first direct voltage differing from said first ratio by the number one-half, a second sawtooth generator for generating a second linear sawtooth voltage wave lagging said first linear sawtooth voltage wave by an amount equal to one-half the time interval between said pulse pair, second gating means for producing a fourth direct voltage equal to the instantaneous magnitude of a voltage wave received at a first input terminal when said second gating means is triggered by a pulse applied to a second input terminal, said second input terminal being coupled to said reference pulse generator, comparator means for producing an error control voltage corresponding to the difference between a pair of input direct voltages, said comparator means being coupled to said second gating means for receiving said fourth direct voltage, means for coupling said first sawtooth voltage wave to the first input terminal of said second gating means and for coupling said second direct voltage to said comparator means when said first ratio has a value corresponding to one of a predetermined range of values, means for coupling said second sawtooth voltage wave to the first input terminal of said second gating means and for coupling said third direct voltage to said comparator means when said first ratio has a value other than one of said predetermined range of values, whereby said comparator means receives a pair of direct voltages representing respectively the position of said indicator with respect to said chart and the position of said point with respect to said area, and servomechanism means coupled to said photoscanner and responsive to said error control voltage for automatically moving said photoscanner to decrease the magnitude of said error control voltage.

12. Apparatus for automatically locating an indicator with respect to a chart representing an area to correspond with the position of a vehicle with respect to said area, the position of said vehicle with respect to said area being described by its location relative to an arbitrary coordinate system fixed with respect to said area, said coordinate system comprising at least one set of substantially equidistant parallel straight lines, said chart being illuminated and having superimposed thereon a plurality of substantially equidistant parallel straight grid lines corresponding to said coordinate lines, said apparatus receiving an input signal representing a first ratio equal to the distance of said vehicle from an adjacent coordinate line divided by the distance between the two coordinate lines adjacent said vehicle, comprising a photoscanner fixed with respect to said indicator and having photosensitive means for producing an output electrical signal in accordance with the amount of light received and a directive means for directing light received from an elemental area of said chart upon said photosensitive means, means for recurrently varying the orientation of said directive means whereby said photosensitive means receives light recurrently and successively from a series of contiguous elemental areas defining a locus transverse to said grid lines, whereby the output signal from said photosensitive means consists of recurrent groups of first pulses corresponding to said grid lines, said groups being recurrent at the frequency of variation of the orientation of said directive means, and the time between pulses of a group corresponding to the spacing of said grid lines along said locus, a reference pulse generator coupled to said photoscanner for generating reference pulses recurrent at the frequency of variation of the orientation of said directive means, said reference pulses having a temporal relationship to the pulses of said groups corresponding to the location of said indicator with respect to said grid lines, a first sawtooth generator coupled to said photoscanner and responsive to said first pulses for generating a first linear sawtooth voltage wave, first gating means coupled to said first sawtooth generator and responsive to said first sawtooth voltage wave for producing a first direct voltage having a magnitude equal to the peak magnitude of the individual sawtooth voltage cycle generated during the interval between the pair of first pulses occurring immediately before and immediately after a reference pulse, first proportioning means responsive to said input signal and coupled to said first gating means for receiving said first direct voltage and for delivering a second direct voltage bearing a ratio to said first direct voltage equal to said first ratio, second proportioning means responsive to said input signal and coupled to said first gating means for receiving said first direct voltage and for delivering a third direct voltage bearing a ratio to said first direct voltage differing from said first ratio by the number one-half, a second sawtooth generator coupled to said first sawtooth generator for receiving said first linear sawtooth voltage wave and for generating a second linear sawtooth voltage wave lagging said first sawtooth voltage wave by an amount equal to one-half the time interval between said pulse pair, second gating means for producing a fourth direct voltage equal to the instantaneous magnitude of a voltage wave received at a first input terminal when said second gating means is triggered by a pulse applied to a second input terminal, said second input terminal being coupled to said reference pulse generator, comparator means for producing an error control voltage corresponding to the difference between a pair of input direct voltages, said comparator means being coupled to said second gating means for receiving said fourth direct voltage, means for coupling said first sawtooth voltage wave to the first input terminal of said second gating means and for coupling said second direct voltage to said comparator means when said first ratio has a value corresponding to one of a predetermined range of values, means for coupling said second sawtooth voltage wave to the first input terminal of said second gating means and for coupling said third direct voltage to said comparator means when said first ratio has a value other than one of said predetermined range of values, whereby said comparator means receives a pair of direct voltages representing respectively the position of said indicator with respect to said chart and the position of said vehicle with respect to said area, and servomechanism means electrically coupled to said comparator and responsive to said error control voltage and mechanically coupled to said photoscanner for automatically moving said photoscanner to decrease the magnitude of said error control voltage.

13. Apparatus as in claim 10 wherein said third point is located midway between said grid lines and said fourth point is located midway between said coordinate lines.

14. Apparatus for comparing the location of a first point with respect to a chart representing an area with the position of a second point with respect to said area, the position of said second point with respect to said area being described by its location relative to an arbitrary coordinate system fixed with respect to said area, said coordinate system comprising at least one set of substantially equidistant parallel straight lines, said chart having superimposed thereon a plurality of substantially equidistant parallel straight grid lines corresponding to said coordinate lines, said apparatus receiving an input signal representing a first ratio equal to the distance of said second point from an adjacent coordinate line divided by the distance between two adjacent coordinate lines, and wherein a first voltage is generated representing a second ratio equal to the distance of said first point from an adjacent grid line corresponding to said adjacent coordinate line divided by the distance between two adjacent grid lines, and a second voltage is generated representing said first ratio, comprising in combination, means for generating a third voltage representing a third ratio equal to the distance of said first point from an adjacent third point located between said grid lines divided by the distance between two adjacent grid lines, means for generating a fourth voltage representing a fourth ratio equal to the distance of said second point from an adjacent fourth point having a location between said coordinate lines corresponding to said third point divided by the distance between two adjacent coordinate lines, and comparator means for producing an error signal corresponding to the difference between a pair of received voltages, said comparator means being adapted to receive said first and second voltages when said first ratio has a value equal to one of a predetermined range of values, said comparator means being further adapted to receive said third and fourth voltages when said first ratio has a value other than one of said predetermined range of values.

15. Apparatus for comparing the location of a fiirst point with respect to a chart representing an area with the position of said second point with respect to said area the position of said second poit with respect to said area being described by its location relative to an arbitrary coordinate system fixed with respect to said area, said coordinate system comprising at least one set of spaced lines, said chart having superimposed thereon a plurality of spaced grid lines corresponding to said coordinate lines, said apparatus receiving an input first signal representing the position of said second point with respect to two adjacent coordinate lines between which said second point lies and wherein a second signal is generated representing the position of said first point with respect to two adjacent grid lines between which said first point lies, comprising in combination, means for generating a third signal representing the position of said first point relative to two adjacent grid lines after said first point and said grid lines have been displaced relative to each other by a distance less than the separation between said adjacent grid lines, means for generating a fourth signal representing the position of said second point relative to said two adjacent coordinate lines after said second point and said coordinate lines have been displaced relative to one another by said distance less than the separation between said two adjacent grid lines, and comparator means for producing an error signal corresponding to the difference between a pair of received signals, said comparator means being connected to receive said first and second signals when said first signal has a value within a predetermined range of values, said range of values corresponding to a predetermined range of positions of said second point intermediate two adjacent coordinate lines, said comparator means being adapted to receive said third and fourth signals when said first signal has a value other than one with said predetermined range of values.

16. Apparatus for comparing the location of a first point with respect to a chart representing an area with the position of a second point with respect to said area, the position of said second point with respect to said area being described by its location relative to an arbitrary coordinate system fixed with respect to said area, said coordinate system comprising at least first, second and third spaced lines, said chart having superimposed thereon first, second and third spaced grid lines corresponding to said coordinate lines, said apparatus receiving an input first signal representing a ratio equal to the distance of said second point from an adjacent coordinate line divided by the distance between two adjacent coordinate lines between which said second point lies, and wherein a second signal is generated representing the position of said first point with respect to two adjacent grid lines between which said first point lies, comprising in combination, means for generating a third signal representing the position of said first point from a third point located between said adjacent grid lines divided by the distance between said first and second grid lines, means for generating a fourth signal representing the distance of said second point from a fourth point located between said first and second coordinate lines divided by the distance between the first and second of said coordinate lines when said second point is disposed therebetween and divided by the distance between said second and third coordinate lines when said second point is disposed therebetween, and comparator means for producing an error signal corresponding to the difference between a pair of received signals, said comparator means being connected to receive said first and second signals when said ratio has a value equal to one of a predetermined range of values, said comparator means being adapted to receive said third and fourth signals when said ratio has a value other than one within said predetermined range of values.

References Cited in the file of this patent

UNITED STATES PATENTS

| | | |
|---|---|---|
| 2,080,511 | Sjostrand | May 18, 1937 |
| 2,198,113 | Holmes | Apr. 23, 1940 |
| 2,508,565 | Chance | May 23, 1950 |
| 2,530,428 | Gray | Nov. 21, 1950 |
| 2,581,438 | Palmer | Jan. 8, 1952 |
| 2,582,588 | Fennessy et al. | Jan. 15, 1952 |